(12) United States Patent
Nakamura et al.

(10) Patent No.: US 8,520,484 B2
(45) Date of Patent: Aug. 27, 2013

(54) OPTICAL INFORMATION REPRODUCTION APPARATUS AND OPTICAL INFORMATION REPRODUCTION METHOD

(75) Inventors: Yusuke Nakamura, Ebina (JP); Kenichi Shimada, Yokohama (JP); Toshiki Ishii, Yokohama (JP); Makoto Hosaka, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/088,462

(22) Filed: Apr. 18, 2011

(65) Prior Publication Data

US 2011/0280112 A1    Nov. 17, 2011

(30) Foreign Application Priority Data

May 12, 2010    (JP) ................... 2010-109786

(51) Int. Cl.
*G11B 7/00* (2006.01)
(52) U.S. Cl.
USPC ............................................. 369/103
(58) Field of Classification Search
USPC ............... 369/103, 109, 106, 112.29, 112.09, 369/112.05; 359/10, 11, 22, 27
See application file for complete search history.

(56) References Cited

U.S. PATENT DOCUMENTS

| | | | |
|---|---|---|---|
| 7,092,133 B2 | 8/2006 | Anderson et al. | |
| 8,120,829 B1* | 2/2012 | Sigel et al. | 369/103 |
| 2006/0187510 A1* | 8/2006 | Kanaoka | 359/35 |
| 2006/0203689 A1* | 9/2006 | Kanaoka et al. | 369/103 |
| 2007/0109943 A1* | 5/2007 | Tsukagoshi et al. | 369/103 |
| 2007/0206255 A1* | 9/2007 | Yamakage et al. | 359/24 |
| 2008/0151337 A1* | 6/2008 | Kanazawa et al. | 359/3 |
| 2009/0009835 A1 | 1/2009 | Kihara et al. | |
| 2009/0073850 A1* | 3/2009 | Ide et al. | 369/103 |
| 2009/0080314 A1 | 3/2009 | Matsumoto et al. | |
| 2009/0135459 A1* | 5/2009 | Uno et al. | 359/22 |
| 2009/0161519 A1* | 6/2009 | Yamamoto et al. | 369/103 |

FOREIGN PATENT DOCUMENTS

| | | |
|---|---|---|
| JP | 2004-272268 | 9/2004 |
| JP | 2006-84526 | 3/2006 |
| JP | 2008-152009 | 7/2008 |
| JP | 2009-80888 | 4/2009 |

OTHER PUBLICATIONS

Japanese Office Action dated Feb. 5, 2013 for Application No. 2010-109786.

* cited by examiner

*Primary Examiner* — Thang Tran
(74) *Attorney, Agent, or Firm* — Antonelli, Terry, Stout & Kraus, LLP.

(57) ABSTRACT

In an optical information reproduction method for reproducing information using holography from a medium which records an interference pattern generated when overlapping a signal beam and a reference beam, the reference beam is radiated to the medium at a reference beam angle with a predetermined range for reproducing the information, a reproduction beam is generated by diffracting the reference beam with the interference pattern, the reproduction beam is detected by a photodetector; and the information is reproduced by processing a signal detected by the photodetector.

10 Claims, 14 Drawing Sheets

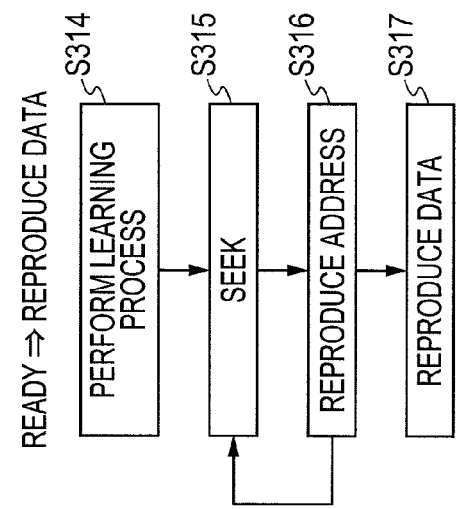
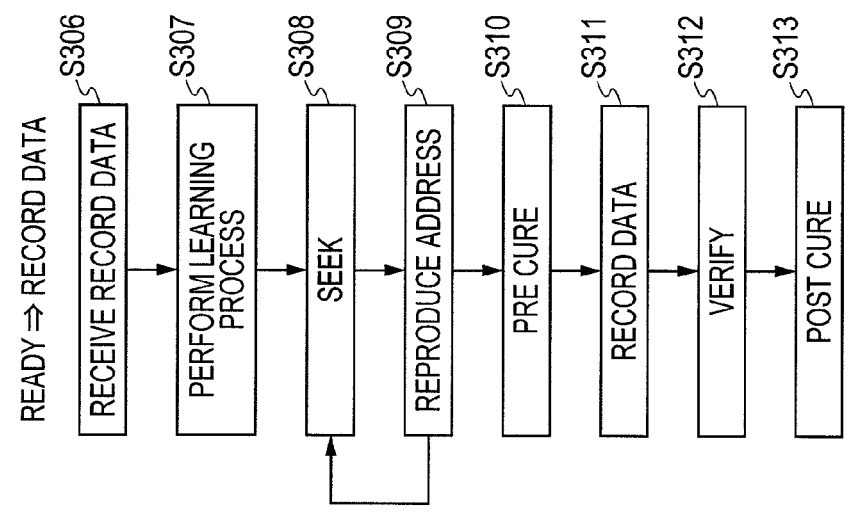
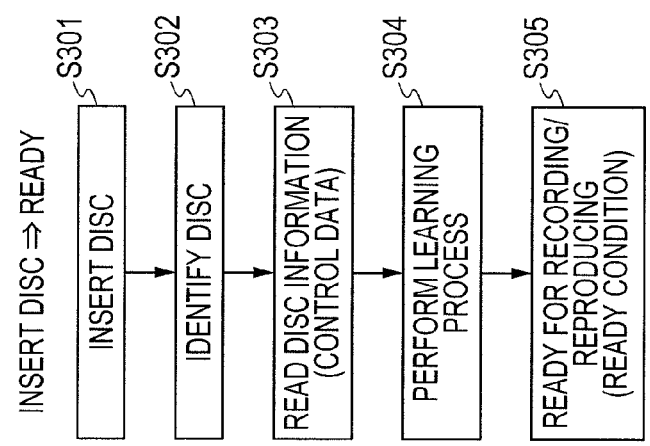

REPRODUCED IMAGE AT $\theta_n$

REPRODUCED IMAGE AT $\theta_n + \delta$

FIRST EMBODIMENT
(REPRODUCED IMAGE AT $\theta_n-\delta - \theta_n+\delta$)

-▫- RELATED ART
-✕- EMBODIMENT
RECORDED REFERENCE BEAM ANGLE = 40.00 [deg]
δ = 0.008 [deg]

OPTICAL INFORMATION REPRODUCTION APPARATUS AND OPTICAL INFORMATION REPRODUCTION METHOD

CLAIM OF PRIORITY

The present application claims priority from Japanese patent application serial No. JP 2010-109786, filed on May 12, 2010, the content of which is hereby incorporated by reference into this application.

BACKGROUND OF THE INVENTION

1. Field of the Invention

The present invention relates to an apparatus and a method for reproducing information from an optical information recording medium using holography.

2. Description of the Related Art

Recently, standard of Blu-ray Disc using blue-violet semiconductor laser has realized commercialization of optical disc with recording density of approximately 50 GB in the consumer market.

The optical disc is highly demanded to have capacity as large as that of the HDD (Hard Disc Drive) with size ranging from 100 GB to 1 TB.

However, new type density growth technology different from the one using short wavelength and objective lens with large NA is required for the purpose of realizing the superdense optical disc.

There has been a trend to study storage technology for next generation, and the holographic recording technology for recording digital information with holography has been focused.

Japanese Unexamined Patent Publication No. 2004-272268 (Patent Document 1) discloses the hologram recording technology. The document discloses an angular multiplexing recording method for recording the hologram by interfering radiated reference beams of parallel light flux simultaneously with condensing the signal light flux on the optical information recording medium using lens, and performing multiplex recording by displaying different page data on the spatial light modulator while changing the incident angle of the reference beam to the optical recording medium. In the document, the signal beam is condensed by the lens, and the opening (spatial filter) is arranged in the beam waist so as to reduce the distance between adjacent holograms. This makes it possible to increase recording density/capacity compared with the related art angular multiplexing recording method.

SUMMARY OF THE INVENTION

The method disclosed in Patent Document 1 performs recording by interfering the signal beam as the condensing light flux and the reference beam as the parallel light flux within the medium. The reproduction requires radiation of the parallel light flux as the reference beam at the same angle as the one set for recording. However, the reference beam angle control requires remarkably high accuracy to satisfy the strict condition for selecting the angle of the reference beam as the one diffracted from the formed hologram.

It is an object of the present invention to provide a holographic reproducing technology, which is capable of reproducing even if strictness of the reference beam angle control upon reproduction is alleviated.

Reproduction may be performed while finely varying the target reference beam angle, for example.

According to the present invention, severity of the accuracy for the reference beam angle control upon recording may be alleviated. This makes it possible to stabilize the angle control, and alleviate compensation accuracy of the angle resulting from expansion/contraction of the medium. As a result, the margin of the reference beam angle upon recording may be enlarged, and the time required for performing the angular control may be reduced.

BRIEF DESCRIPTION OF THE DRAWINGS

These and other features, objects and advantages of the present invention will become more apparent from the following description when taken in conjunction with the accompanying drawings wherein:

FIGS. 3A to 3C are flowcharts of exemplary process flow executed by the optical information reproduction apparatus;

DESCRIPTION OF THE PREFERRED EMBODIMENTS

Exemplary embodiments of the present invention will be described hereinafter.

First Embodiment

Figure 1:
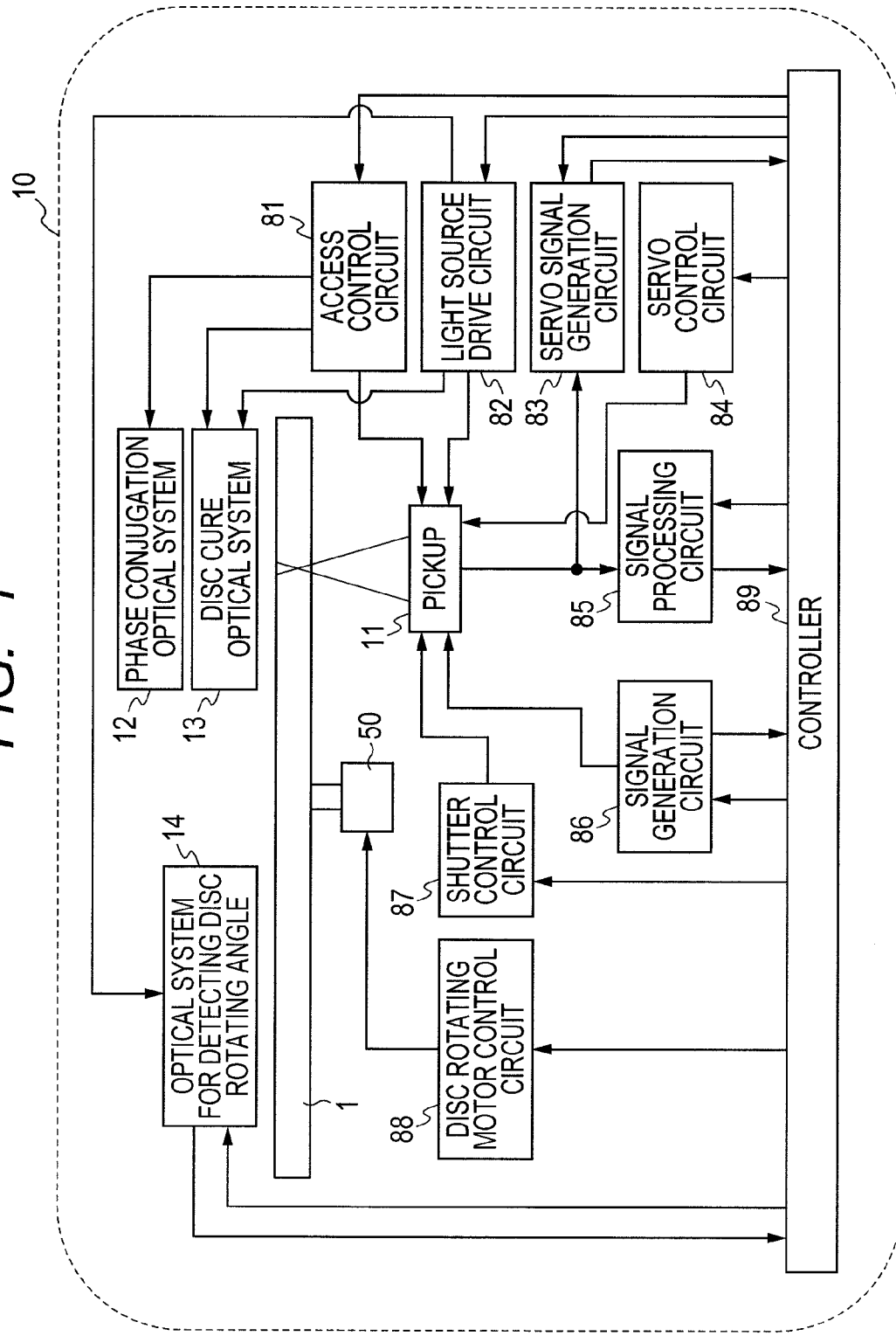
FIG. 1 is a schematic view representing an optical information reproduction apparatus according to an exemplary embodiment.

FIG. 1 is a schematic view showing a general structure of an optical information recording/reproduction apparatus for recording and/or reproducing digital information using holography.

An optical information recording/reproduction apparatus 10 includes a pickup 11, a phase conjugate optical system 12, a disc Cure optical system 13, an optical system 14 for detecting disc rotating angle, and a rotary motor 50. An optical information recording medium 1 is configured to be rotatable by the rotary motor 50.

The pickup 11 emits reference beam and signal beam to the optical information recording medium 1 for recording the digital information using holography.

At this time, the information signal to be recorded is transmitted to a spatial light modulator (described later) within the pickup 11 by a controller 89 via a signal generation circuit 86 so that the signal beam is modulated by the spatial light modulator.

When reproducing the information recorded in the optical information recording medium 1, the phase conjugate beam of the reference beam emitted from the pickup 11 is generated by the phase conjugate optical system 12. The phase conjugate beam denotes the optical wave which proceeds in the reverse direction of the input beam while holding the same wavefront. The beam recovered by the phase conjugate beam is detected by a photodetector (described later) within the pickup 11 so that a signal is reproduced by a signal processing circuit 85.

Time for radiating the reference beam and the signal beam to the optical information recording medium 1 may be adjusted by controlling the time for opening/closing a shutter (described later) within the pickup 11 via a shutter control circuit 87.

The disc Cure optical system 13 serves to generate optical beam used for pre-cure and post-cure of the optical information recording medium 1. The term "pre-cure" denotes a preceding process for preliminarily radiating a predetermined optical beam before radiation of the reference beam and the signal beam to the desired position upon recording of information at a desired position in the optical information recording medium 1. The term "post-cure" denotes a post process for radiating the predetermined optical beam to a desired position after recording the information at the desired position in the optical information recording medium 1 so as to invalidate additional writing of further information to the desired position.

The optical system 14 for detecting disc rotating angle is used for detecting the rotating angle of the optical information recording medium 1. In the case where the optical information recording medium 1 is adjusted to set the predetermined rotating angle, the signal corresponding to the rotating angle is detected by the optical system 14 for detecting the disc rotating angle. The detected signal may be used for controlling the rotating angle of the optical information recording medium 1 by the controller 89 via a disc rotating motor control circuit 88.

A light source drive circuit 82 supplies predetermined light source drive current to light sources of the pickup 11, the disc Cure optical system 13, and the optical system 14 for detecting disc rotating angle. The respective light sources emit optical beams each with predetermined light intensity.

Each of the pickup 11, the phase conjugate optical system 12 and the disc Cure optical system 13 is provided with a mechanism which allows a sliding operation in a radial direction of the optical information recording medium 1 so that the position control is executed via an access control circuit 81.

The holographic recording technology allows superdense information to be recorded, and accordingly, tolerance with respect to gradient and positional deviation of the optical information recording medium 1 tends to be severely narrow. For this, the pickup 11 may be provided with the mechanism therein for detecting deviation, for example, gradient and positional deviation of the optical information recording medium 1. Then the optical information recording/reproduction apparatus 10 may be provided with a servo mechanism therein for correcting the detected deviation under the control of a servo control circuit 84 based on a servo controlling signal generated by a servo signal generation circuit 83.

The pickup 11, the phase conjugate optical system 12, the disc Cure optical system 13, and the optical system 14 for detecting disc rotating angle may have some or all of the optical system structures combined with a single structure for simplification.

Figure 2:
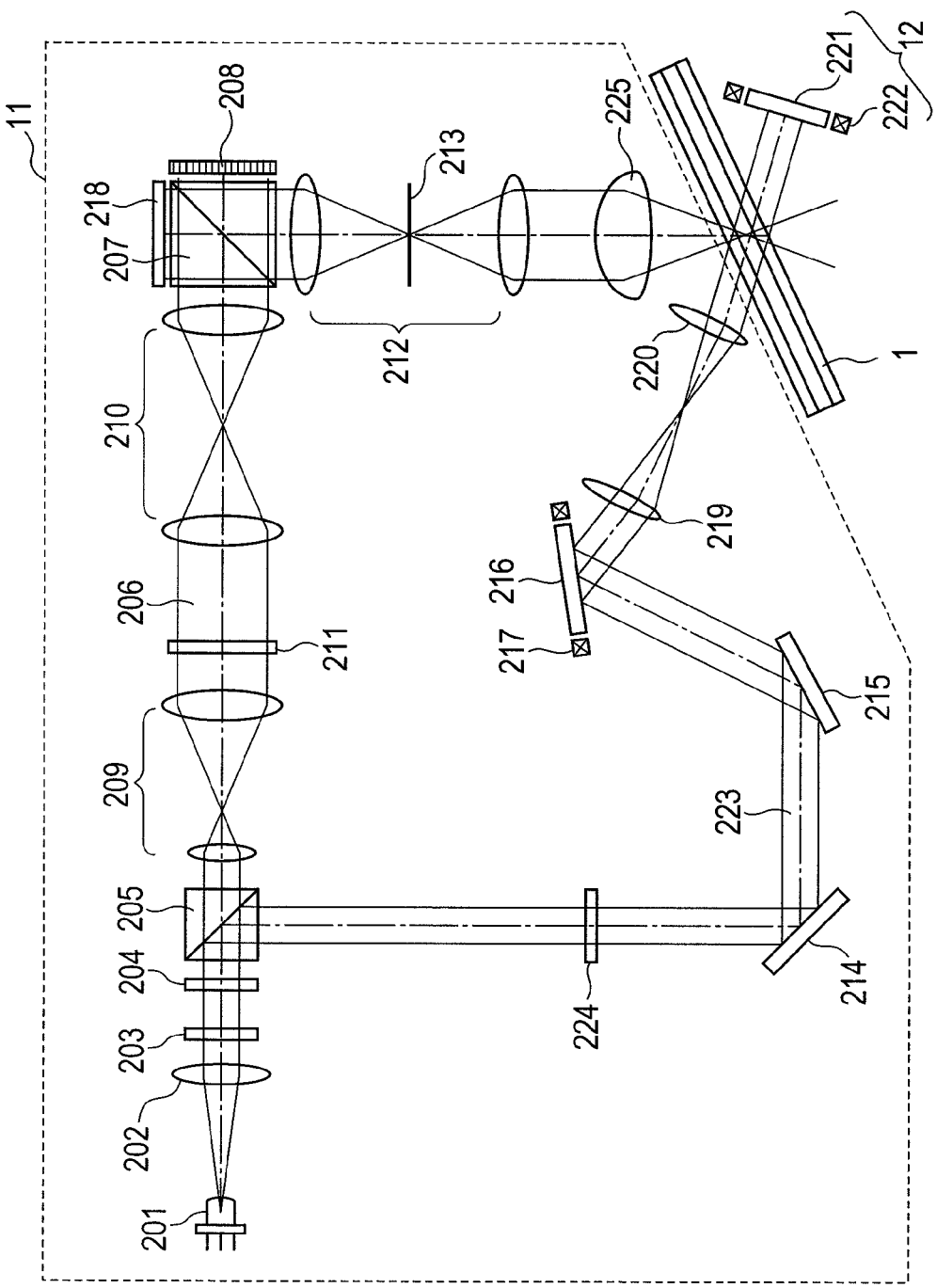
FIG. 2 is a schematic view representing a pickup in the optical information reproduction apparatus according to an exemplary embodiment.

FIG. 2 shows an example of the optical system structure of the pickup 11 in the optical information recording/reproduction apparatus 10. The optical beam from a light source 201 transmits a collimated lens 202, and is made incidence to a shutter 203. While the shutter 203 is opened, the optical beam passes through the shutter 203, and is subjected to polarization direction control by an optical element 204 formed of a half-wavelength plate so that light intensity ratio between p-polarized component and s-polarized component becomes a desired ratio. It is then made incidence to a PBS (Polarization Beam Splitter) prism 205.

The optical beam which has transmitted the PBS prism 205 has its diameter expanded by a beam expander 209, transmits a phase mask 211, a relay lens 210 and a PBS prism 207, and then is made incidence to a spatial light modulator 208.

The signal beam to which the information is added by the spatial light modulator 208 is reflected by the PBS prism 207, and propagates through a relay lens 212 and a spatial filter 213. Thereafter, the signal beam is condensed on the optical information recording medium 1 by an objective lens 225.

Meanwhile, the optical beam reflecting from the PBS prism 205 serves as the reference beam, and is set in a predetermined polarizing direction by a polarizing direction transformation device 224 in accordance with recording or reproduction. It is made incidence to a galvanic mirror 216 via mirrors 214 and 215. The angle of the galvanic mirror 216 may be adjusted by an actuator 217. The incident angle of the reference beam which is made incidence to the optical information recording medium 1 may be set to the desired angle after passage through the lenses 219 and 220.

As described above, the signal beam and the reference beam are made incidence to the optical information recording medium 1 while being overlapped so as to form an interference pattern in the recording medium. The information is recorded by writing the pattern in the recording medium. The incident angle of the reference beam that has been made incidence to the optical information recording medium 1 may be changed by the galvanic mirror 216, thus enabling angular multiplexing recording.

When reproducing the recorded information, the reference beam is made incidence to the optical information recording medium 1, and the optical beam which has transmitted the optical information recording medium 1 is reflected by the galvanic mirror 221 to generate phase conjugate beams.

The optical beam recovered by the phase conjugate beam propagates through the objective lens 225, the relay lens 212 and the spatial filter 213. Then the recovered beam transmits the PBS prism 207, and is made incidence to a photodetector 218 so as to reproduce the recorded signal.

The optical system structure of the pickup 11 is not limited to the one shown in FIG. 2. FIGS. 3A to 3C represent process flows of recording/reproduction performed by the optical information recording/reproduction apparatus 10.

FIG. 3A represents the process flow starting from insertion of the optical information recording medium 1 into the optical information recording/reproduction apparatus 10 until the end of preparation for recording or reproduction. FIG. 3B represents the process flow from the ready condition until recording of the information in the optical information recording medium 1. FIG. 3C represents the process flow from the ready condition until reproduction of the information recorded in the optical information recording medium 1.

Referring to FIG. 3A, when the medium is inserted in S301, the optical information recording/reproduction apparatus 10 makes a disc determination whether the inserted medium is the one for recording or reproducing the digital information using holography in S302.

When it is determined that the medium is the optical information recording medium for recording or reproducing the digital information using holography, the optical information recording/reproduction apparatus 10 reads control data stored in the optical information recording medium to obtain information with respect to the optical information recording medium or the information with respect to various setting conditions for recording and reproducing in S303.

After reading the control data, various adjustment in accordance with the control data, and learning process relevant to the pickup 11 are performed in S304. Then the optical information recording/reproduction apparatus 10 becomes ready for recording or reproduction in S305.

Referring to FIG. 33 representing the process flow from the ready condition until recording of the information, the data to be recorded are received, and the information corresponding to the data are transmitted to the spatial light modulator within the pickup 11 in S306.

Then various types of learning process are preliminarily performed in need so as to record high quality information in the optical information recording medium in S307. Each position of the pickup 11 and the disc Cure optical system 13 is set to the predetermined positions in the optical information recording medium while repeatedly executing seeking operation in S308 and address reproduction in S309.

The optical beam from the disc Cure optical system 13 is used for pre-curing the predetermined region in S310. The reference beam and the signal beam from the pickup 11 are used for recording the data in S311.

After recording, the data are verified in need in S312, and the optical beam from the disc Cure optical system 13 is used for post-curing in S313.

Referring to FIG. 3C representing the process flow from the ready condition until reproduction of the recorded information, various types of learning process are preliminarily executed in need so that high quality information is reproduced from the optical information recording medium in S314. Thereafter, each position of the pickup 11 and the phase conjugate optical system 12 is set to predetermined positions in the optical information recording medium while repeatedly executing seeking operation in S315 and address reproduction in S316. Then the reference beam is emitted from the pickup 11 to read the information recorded in the optical information recording medium in S317.

According to the recording method as described above, the galvanic mirror 216 shown in FIG. 2 is capable of changing the incident angle of the reference beam which is made incidence to the optical information recording medium 1. This makes it possible to perform an angular multiplexing recording.

Figure 5:
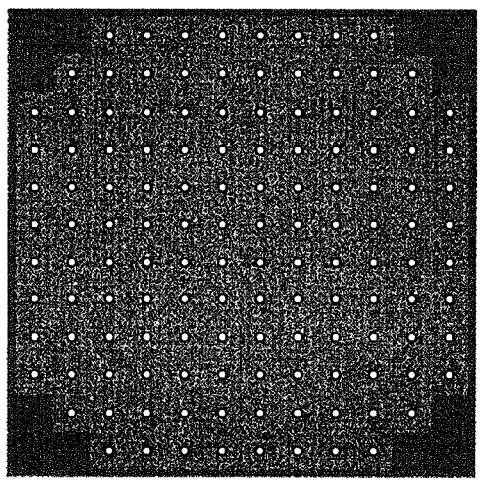
FIG. 5 shows an image reproduced at the reproduction reference beam angle $\theta_n$ in the optical information reproduction apparatus.
Figure 6:
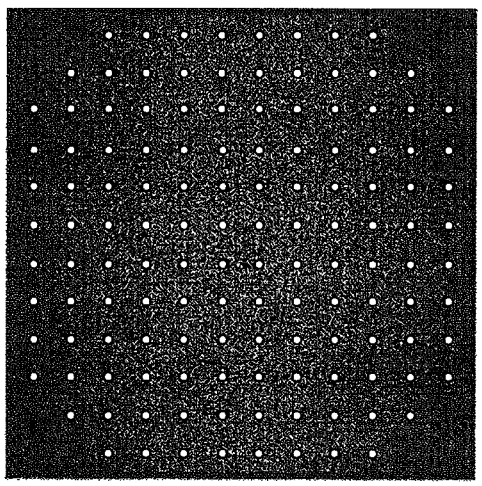
FIG. 6 shows an image reproduced at the reproduction reference beam angle $\theta_n+\delta$ in the optical information reproduction apparatus.

Assuming that the embodiment is not applied, the effect resulting from deviation of the reference beam angle from the target value upon reproduction will be described referring to FIGS. 4, 5 and 6.

Figure 4:
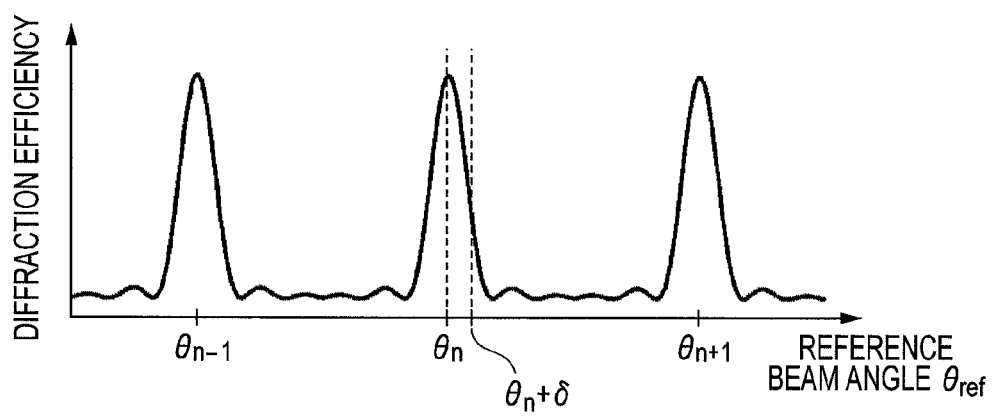
FIG. 4 shows diffraction efficiency with respect to the reproduction reference beam angle of the optical information reproduction apparatus.

FIG. 4 shows dependency of the diffraction efficiency on the reference beam angle when the recording in the medium is performed at the respective reference beam angles of $\theta_{n-1}$, $\theta_n$, and $\theta_{n+1}$. In the case where recording is performed at the same angle as the one upon recording, for example, $\theta_n$, the diffraction efficiency with maximum intensity may be obtained. Meanwhile, deviation of the angle may quickly degrade the efficiency. FIG. 5 shows a simulation result of the image reproduced at the reference beam angle $\theta_n$. Reproduction at the reference beam angle $\theta_n$ that is the same as the one upon recording is performed with uniform brightness over the entire region. Meanwhile, FIG. 6 shows a simulation result of the image reproduced at the reference optical angle that deviates from the reference beam angle $\theta_n$ by a considerably small angle $\delta$. The drawing clearly shows that reproduction at the reference beam angle $\theta_n+\delta$ deviated from the one upon recording may fail to correctly reproduce in the region around the edge of the image with uneven brightness. The reference beam angle control demands considerably high accuracy as described above.

The reference beam angle control method according to the embodiment will be described referring to FIGS. 7, 8, 9, 10 and 11.

As described above, when reproducing the recorded information, the reference beam is made incidence to the optical information recording medium 1 so that the optical beam that has transmitted the optical information recording medium 1 is reflected by the galvanic mirror 221 for generating the phase conjugate beam. The recovered optical beam recovered by the phase conjugate beam is made incidence to the photodetector 218 in final stage, thus reproducing the recorded signal.

Figure 7:
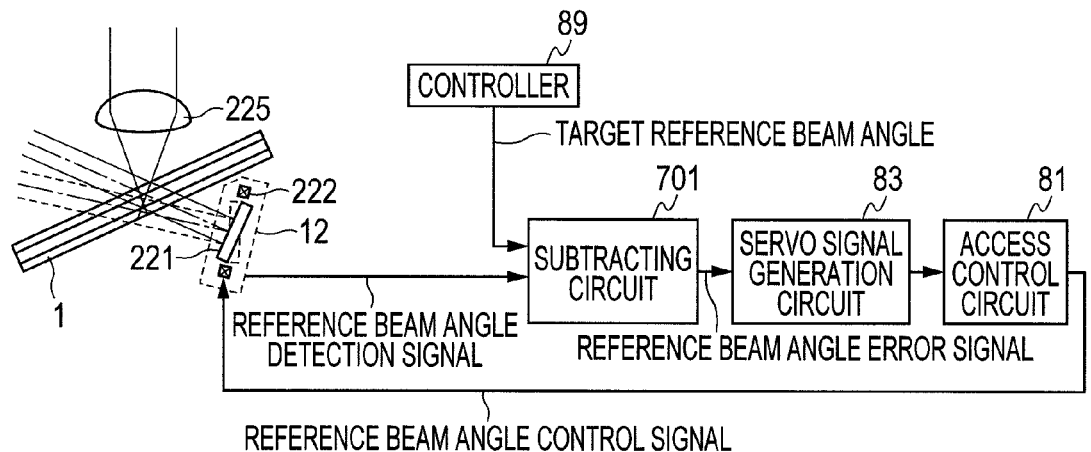
FIG. 7 shows a control circuit for a phase conjugate optical system in the optical information reproduction apparatus according to an exemplary embodiment.

FIG. 7 shows a control circuit for the phase conjugate optical system 12 shown in FIG. 2. A target reference beam angle as the control target given by the controller 89, and a reference beam detection signal indicating a current reference beam angle calculated by the phase conjugate optical system 12 are input to a subtracting circuit 701. The subtracting circuit 701 generates a reference beam angle error signal as a difference between two input values. In the course of passage via a servo signal generation circuit 83 and the access control circuit 81, the error signal is subjected to filtering so as to be processed to the reference beam angle control signal suitable for controlling the actuator 222. The reference beam angle control signal is used for activating the actuator 222 to change its angle. The resultant error is subjected to the feedback control repeatedly to approximate the angle to the desired target reference beam angle. FIG. 7 shows operation of the circuit. However, software may be used for realizing the same function. The reference beam angle control method is not limited to the one shown in FIG. 7, but may be provided as the arbitrary method so long as the angle of the galvanic mirror 221 is allowed to be adjusted to the target angle.

Figure 8:
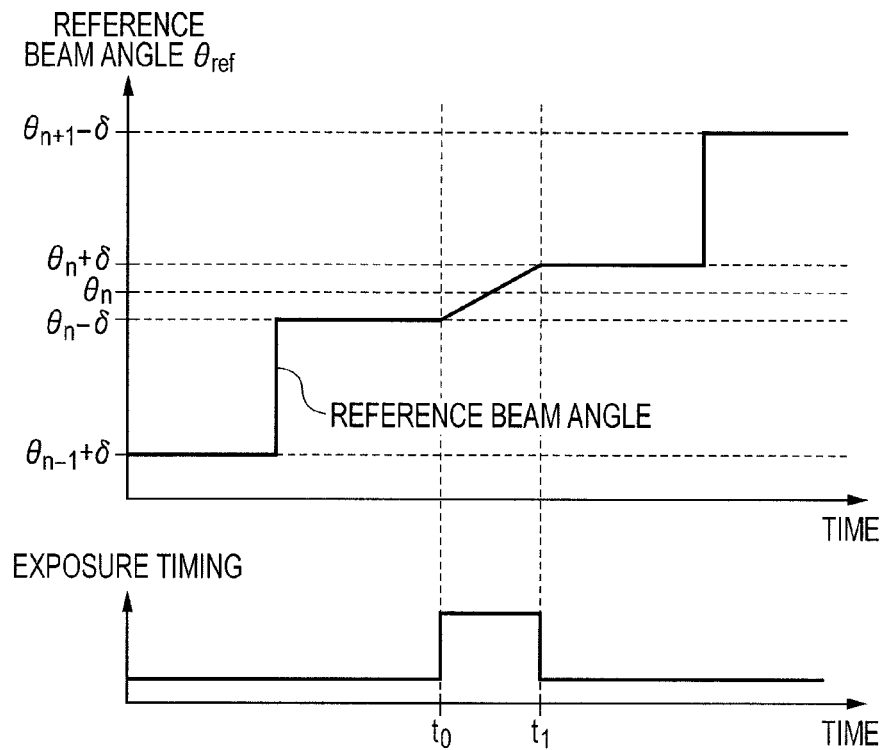
FIG. 8 shows an example of an exposure timing with respect to change in the reproduction reference beam angle in the optical information reproduction apparatus.

FIG. 8 shows an exposure (shooting) timing of the photodetector 218 with respect to change in the reference beam angle. In the embodiment, the recovered beam which is made incidence to the photodetector 218 is exposed for a period (t0 to t1) for which the galvanic mirror 221 changes at the reference beam angle ranging from $\theta_n - \delta$ to $\theta_n + \delta$ as the margin derived from adding the small angle+/−δ as the angular deviation to the target reference beam angle $\theta_n$.

The reproduction may be performed not only at the reproduction reference beam angle $\theta_n$ as shown in FIG. 4, but in a certain range of the reference beam angle from $\theta_n - \delta$ to $\theta_n + \delta$. If the angle deviates from the $\theta_n$, the reproduction may be performed so long as the deviated angle is within the range between $\theta_n - \delta$ and $\theta_n + \delta$.

Figure 10:
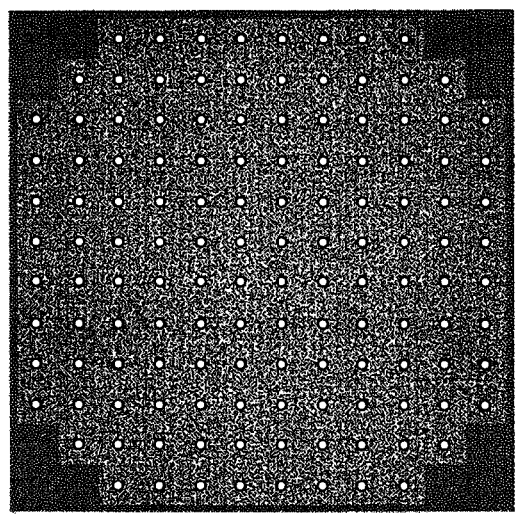
FIG. 10 is a view showing an example of a reproduced image formed by the optical information reproduction apparatus according to the exemplary embodiment.
Figure 11:
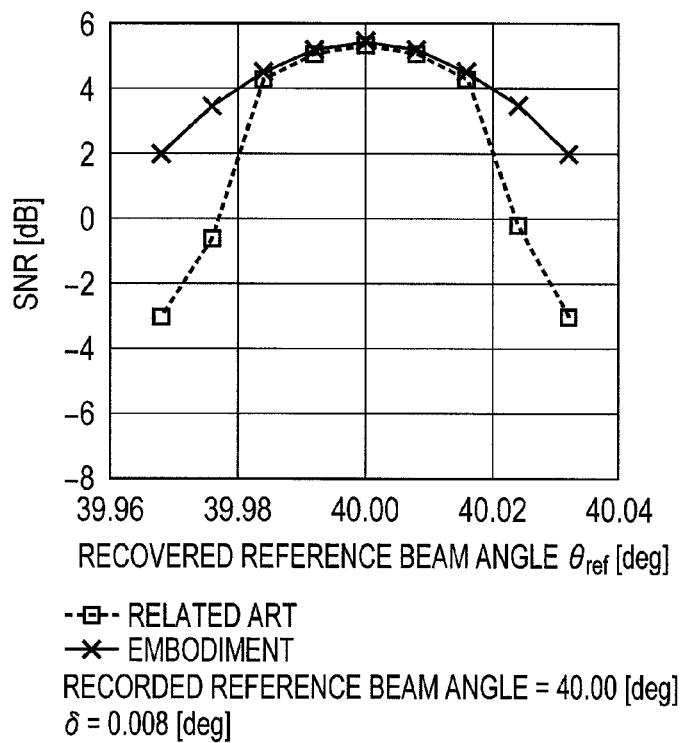
FIG. 11 a view representing dependency of SNR on reproduction reference beam angle in the optical information reproduction apparatus according to the exemplary embodiment.

FIG. 10 shows a simulated result of the reproduced image at the reference beam angle ranging from $\theta_n - \delta$ to $\theta_n + \delta$. Brightness spots are observed in FIG. 10, but the region of reproduction failure is markedly reduced compared with the image shown in FIG. 6. The brightness spots may be made negligible through image correction for making average values of the brightness uniform. FIG. 11 shows a simulated result of dependency of SNR (Signal to Noise Ratio) subjected to the signal processing on the reference beam angle. The simulation is performed by changing the reference beam angle with respect to the hologram recorded at the reference beam angle of 40° while setting the small angle δ to 0.008°.

In the distribution of the brightness values of On pixels and Off pixels in the reproduced page data, the SNR is calculated using the following formula:

$$SNR = (\mu_{on} - \mu_{off})/(\sigma_{on} + \sigma_{off}) \quad (1)$$

where $\sigma_{on}$, $\sigma_{off}$ denote standard deviations, and $\mu_{on}$, $\mu_{off}$ denote the respective average values.

The result shows possibility that application of the embodiment markedly improves the SNR. The margin of the reproduced reference beam angle may be enlarged by setting the small angle δ to a large value. However, it is preferable to set the small angle to an intermediate value between the reference beam angle $\theta_n$ at which the subject page data are recorded and the reference beam angle $\theta_{n-1}$ at which the adjacent page data are recorded, that is, $(\theta_n - \theta_{n-1})/2$ for suppressing crosstalk with the adjacent page data. The small angle δ is not limited to the aforementioned value.

The small angle δ does not have to take a constant value during reproduction, but may be changed in accordance with the interval between the reference beam angles, which varies for each of the respective page data during recording as it is effective for suppressing the crosstalk with the adjacent page data.

As described above, the galvanic mirror 221 is used for changing the reference beam angle. However, it is not limited to the aforementioned structure, but the process may be applied to some of or all of the components relevant to the reference beam angle control, for example, the galvanic mirrors 221 and 216 may be simultaneously controlled.

FIG. 8 shows a linear function which expresses the change in the reference beam angle from t0 to t1. However, the control of the reference beam angle is not limited to the aforementioned way, but to an arbitrary way so long as the angle changes during the exposure period.

The aforementioned structure is applied to the following embodiments as well.

Second Embodiment

This embodiment is different from the first embodiment in the reference beam angle control method as shown in FIG. 7 and the timing for exposing the photodetector 218 with respect to change in the reference beam angle as shown in FIG. 8.

In the first embodiment, the reference beam angle during exposure is increased (decreased) over time. In the second embodiment, reproduction is performed while oscillating the angle by the small angle δ.

Figure 12:
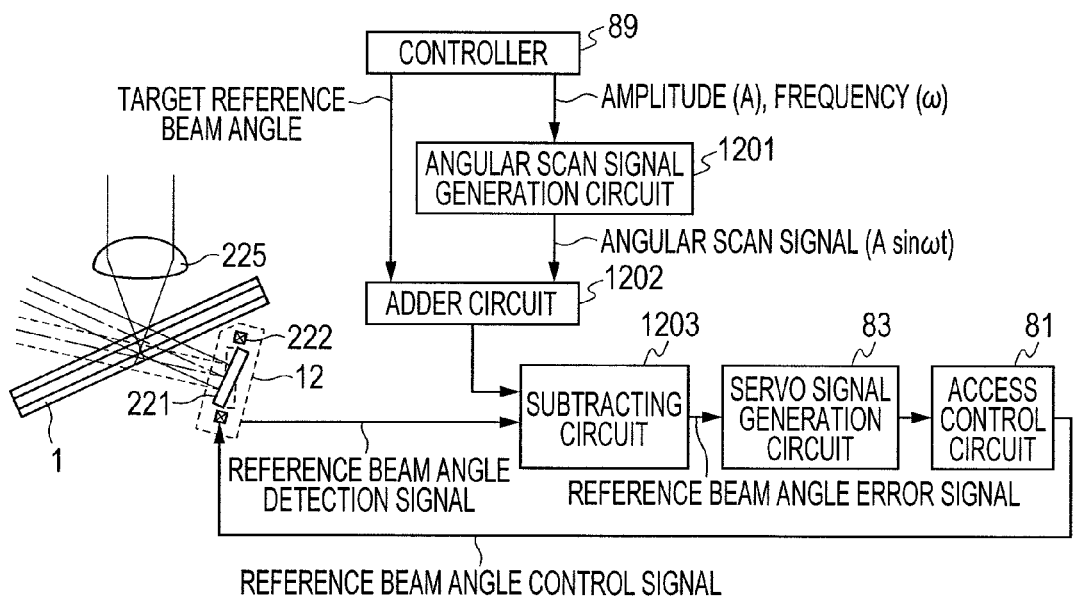
FIG. 12 is a view showing a control circuit for a phase conjugate optical system in the optical information reproduction apparatus according to an exemplary embodiment.

FIG. 12 shows a reference beam angle control method according to the embodiment.

The controller 89 provides a target reference beam angle as the control target. An amplitude (A) of the angular scan signal corresponding to the target reference beam angle, and an angular frequency (ω) are input from the controller 89 to an angular scan signal generation circuit 1201 for determining the angular scan signal. Those values A and ω may be kept constant. However, in the case where the interval between the reference beam angles is changed during recording, it is preferable to vary the small angle δ. Accordingly, they may be given in accordance with the changed values from the controller 89. The angular scan signal generation circuit 1201 outputs a sinusoidal wave (A sin ωt) based on values A and ω, which will be added to the target reference beam angle by an adder circuit 1202. The added result and the reference angle detection signal indicating the current reference beam angle calculated by the phase conjugate optical system 12 are input to a subtracting circuit 701. The subtracting circuit 701 generates a reference beam angle error signal as a difference between two input values, and the error signal is filtered in the course of passing through the servo signal generation circuit 83 and the access control circuit 81 for obtaining the appropriate reference beam angle control signal suitable for controlling the actuator 222. The reference beam angle control signal is used for activating the actuator 222 to change the angle of the galvanic mirror 221. The resultant error is approximated to the desired target reference beam angle by repeatedly executing the feedback control. As the angular scan signal is applied, it does not coincide with the target reference beam angle, resulting in oscillated reference beam angle with respect to the target reference angle as the center. FIG. 12 shows the operation of the circuit. However, software may be used for realizing the same function. The reference beam angle control method is not limited to the way shown in FIG. 12, but arbitrary way may be employed so long as the galvanic mirror 221 is oscillated from the target angle as the center by the small angle $\delta$. For example, the angular scan signal may be added to an output from the subtractor circuit 1203 rather than the target reference beam angle.

Figure 13:
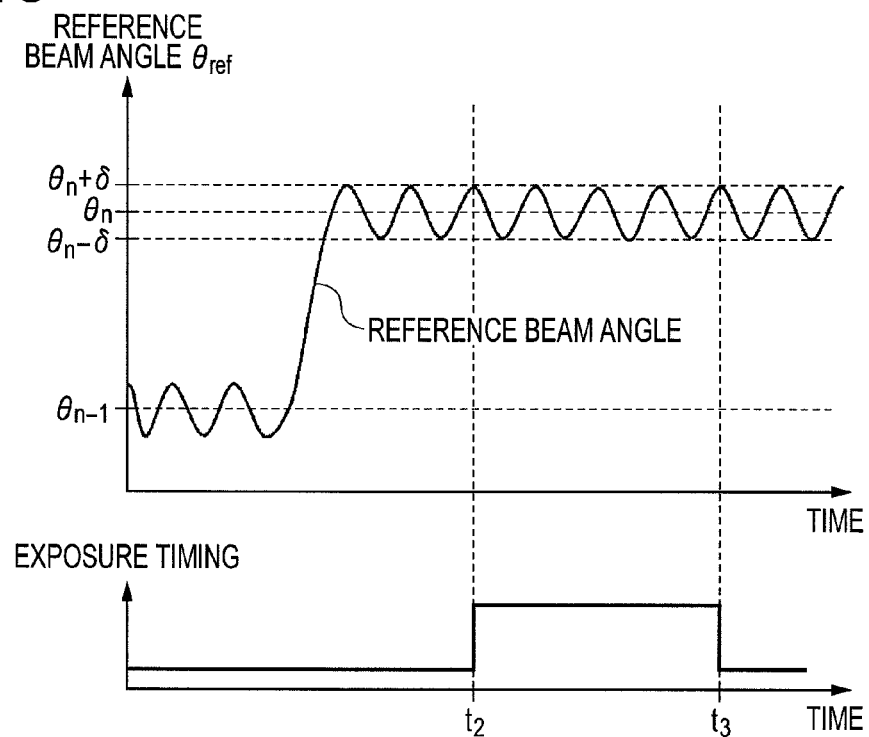
FIG. 13 shows an exposure timing with respect to change in the reproduction reference beam angle in the optical information reproduction apparatus according to an exemplary embodiment.

FIG. 13 shows the exposure timing of the photodetector 218 with respect to change in the reference beam angle.

Under the aforementioned reference beam angle control, the galvanic mirror 221 is oscillated at the reference beam angle in the range from $\theta_n-\delta$ to $\theta_n+\delta$. After the reference beam angle as the oscillation center reaches the target reference beam angle, the recovered beam which is made incidence to the photodetector 218 is exposed for a period (t2 to t3) equal to or longer than ½ cycle ($\pi/\omega$) of oscillation.

In the above description, the angular scan signal is always added to the target reference beam angle. After the reference beam angle reaches the target reference beam angle $\theta_n$, or at an elapse of a predetermined time after the target reference angle is changed from $\theta_{n-1}$ to $\theta_n$, the structure may be configured to add the angular scan signal to the target reference beam angle.

According to the embodiment, if the exposure time of the photodetector 218 is sufficiently long compared with the cycle of the angular scan signal, the margin of the reproduced reference angle may be easily enlarged by applying the angular scan signal to the generally employed system.

Third Embodiment

This embodiment is different from the first embodiment in change in the reference beam angle and the exposure timing of the photodetector 218 as shown in FIG. 8.

In the first embodiment, the reference beam angle during exposure is increased (decreased) over time. In the embodiment, reproduction is performed during transient adaptive period under the reference beam angle control.

Figure 14:
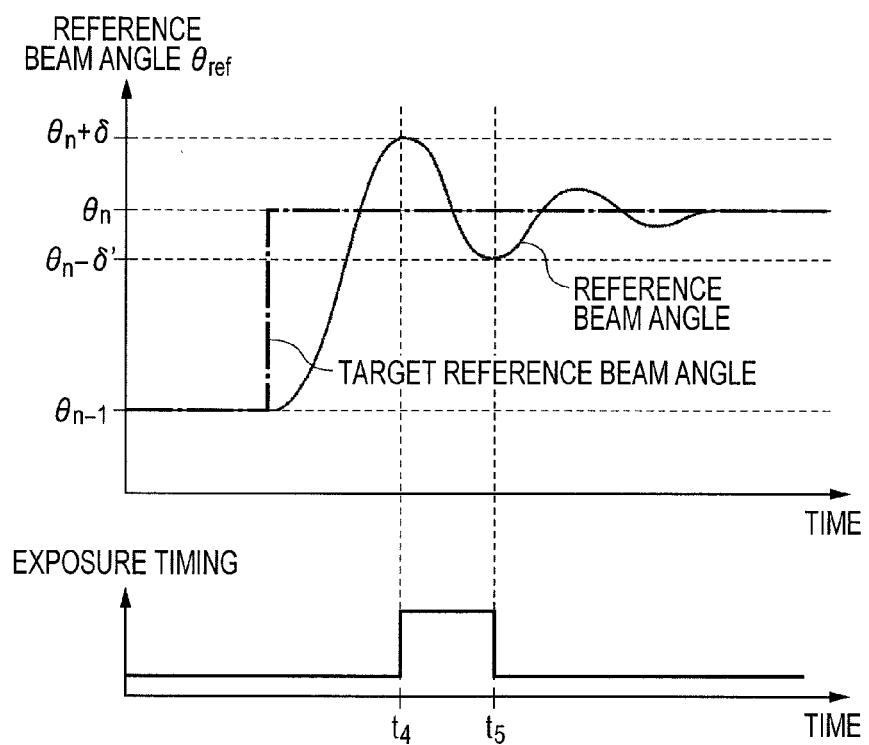
FIG. 14 shows an exposure timing with respect to change in the reproduction reference beam angle in the optical information reproduction apparatus according to an exemplary embodiment.

FIG. 14 shows the exposure timing of the photodetector 218 with respect to change in the reference beam angle according to the exemplary embodiment.

Under the reference beam angle control according to the first embodiment, if the target reference beam angle is changed from $\theta_{n-1}$ to $\theta_n$, the reference beam angle at which the galvanic mirror 221 responds is actually kept unstable for a while as the reference beam angle in FIG. 14 shows. The response characteristic may be calculated based on property of the actuator 222 and the galvanic mirror 221. The recovered beam which has been made incidence to the photodetector 218 is exposed for a period (from t4 to t5) corresponding to the change in the reference beam angle of the galvanic mirror 221 from $\theta_n+\delta$ to $\theta_n-\delta'$.

FIG. 14 shows the exposure period (from t4 to t5) which is approximately ½ cycle of the angular oscillation. However, it is not limited to the aforementioned figure so long as exposure is performed during the transient response period.

According to the embodiment, the exposure may be performed during the transient response period before stabilization of the angle, thus reducing accuracy of the angular control and the value required for stabilization. This makes it possible to reduce the time taken for the angle change and to make the high speed transfer feasible.

Fourth Embodiment

This embodiment is different from the first embodiment in the change in the reference beam angle and the exposure timing of the photodetector 218 as shown in FIG. 8.

According to the first embodiment, the reference beam angle is adjusted discontinuously. In this embodiment, the reference beam angle is continuously changed, and exposure is performed only in the range of corresponding angle for reproduction.

Figure 15:
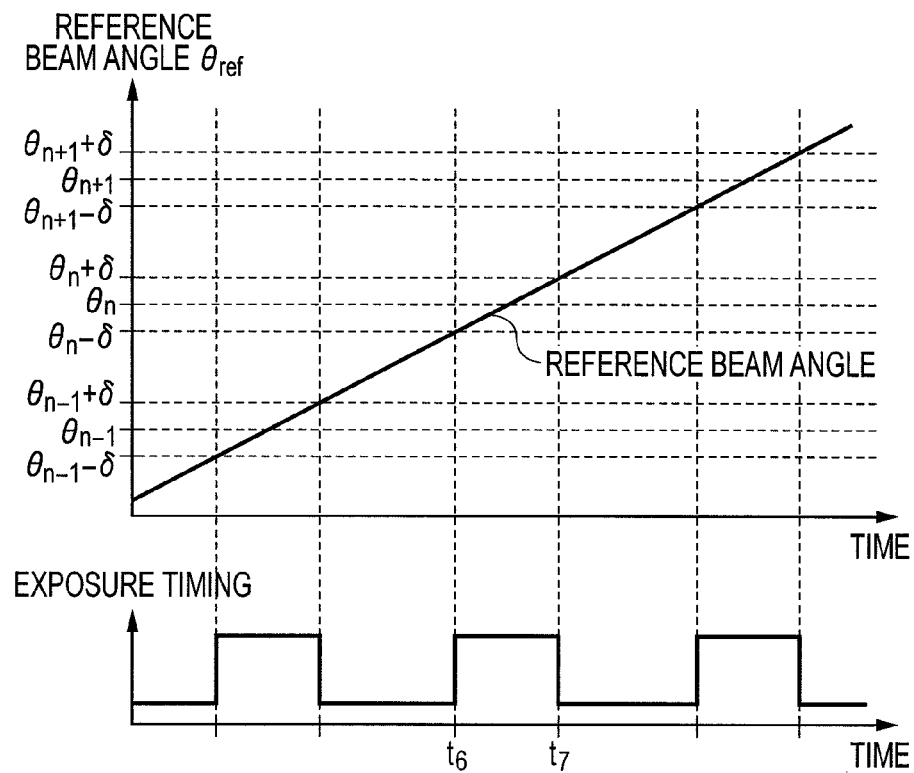
FIG. 15 shows an exposure timing with respect to change in the reproduction reference beam angle in the optical information reproduction apparatus according to an exemplary embodiment.

FIG. 15 shows the exposure timing of the photodetector 218 with respect to the change in the reference beam angle according to the embodiment.

Referring to FIG. 15, the reference beam angle is continuously changed. Upon reproduction of page data recorded at the angle $\theta_n$, the recovered beam which has been made incidence to the photodetector 218 is exposed for a period (t6 to t7) corresponding to the change in the reference beam angle of the galvanic mirror 221 from $\theta_n-\delta$ to $\theta_n+\delta$.

The change in the reference beam angle is expressed in the form of linear function as shown in FIG. 15. However, it is not limited to the aforementioned way. For example, the speed at the angle ranging from $\theta_n-\delta$ to $\theta_n+\delta$ as a part of the range from $\theta_{n-1}+\delta$ to $\theta_n-\delta$ may be decelerated.

According to the embodiment, the angle does not have to be sharply changed, and accordingly, control stability is improved. The time waiting for stabilizing the angle may be reduced, thus making high speed transfer feasible.

Fifth Embodiment

This embodiment is different from the first embodiment in the reference beam angle control method shown in FIG. 7.

According to the first embodiment, the actuator 222 is used for changing the small angle $\delta$. In the embodiment, another element such as a piezoelectric element is employed for the change.

Figure 16:
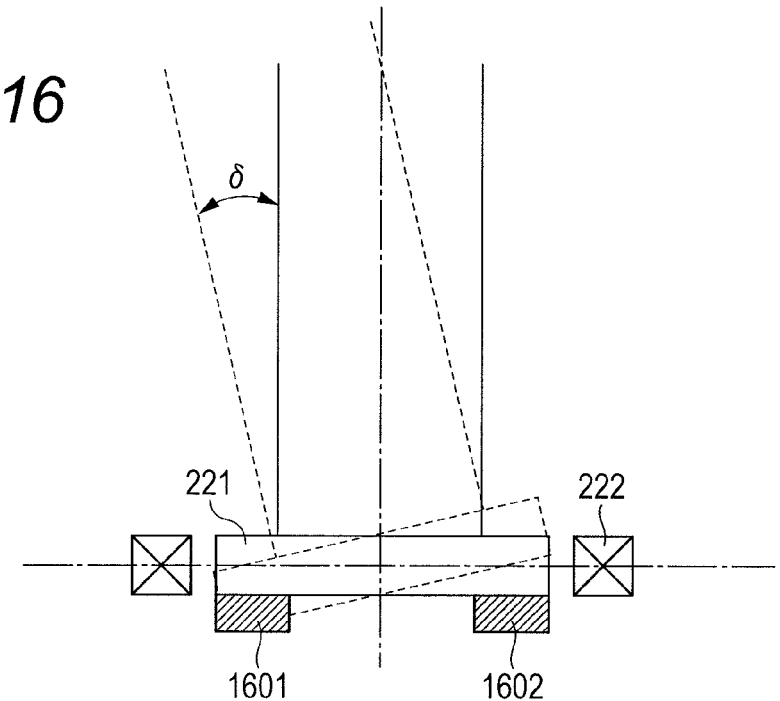
FIG. 16 shows a phase conjugate optical system in the optical information reproduction apparatus according to an exemplary embodiment.

FIG. 16 shows the method for changing the small angle of the reference beam angle according to the embodiment.

A first piezoelectric element 1601 and a second piezoelectric element 1602 are provided on a back surface of the galvanic mirror 221. The piezoelectric element realizes small displacement by application of voltage. The displacement and oscillation cycle may be arbitrarily set by changing the voltage and frequency to be applied.

The reference beam angle control method using the structure shown in FIG. 16 will be described.

When reproducing the page data recorded at the reference beam angle $\theta_n$, for example, the actuator 222 is activated. After the reference beam angle reaches the target reference beam angle $\theta_n$, or at the elapse of a predetermined time after the target reference beam angle has been changed from $\theta_{n-1}$ to $\theta_n$, the voltage that periodically fluctuates is applied to the first piezoelectric element 1601, and the voltage which periodically fluctuates at the opposite phase of the voltage applied to the first piezoelectric element 1601 is applied to the second piezoelectric element 1602 for oscillating the galvanic mirror 221. While oscillating the galvanic mirror, the recovered beam which has been made incidence to the photodetector 218 is exposed.

FIG. 16 shows the structure provided with two elements of the first piezoelectric element 1601 and the second piezoelectric element 1602. However, the number of the piezoelectric elements to be used is not limited to the aforementioned number. Only one piezoelectric element or a plurality of piezoelectric elements may be employed for oscillation.

FIG. 16 shows an example using the piezoelectric element for oscillating the galvanic mirror 221. However, it is not limited to the above-described structure so long as the galvanic mirror 221 is oscillated by the element other than the actuator 222.

The voltage which periodically fluctuates is constantly applied to the piezoelectric element so as to control the actuator 222 while being kept oscillated.

As described above, the galvanic mirror 221 is provided with the first piezoelectric element 1601 and the second piezoelectric element 1602. However, it is not limited to the aforementioned structure. The galvanic mirror 216 as shown in FIG. 2 may be provided with those piezoelectric elements by applying embodiment to some or all of the components relative to the reference beam angle control.

According to the exemplary embodiment, the cycle for changing the small angle δ is not limited to performance of the actuator 222, but may be changed at high speeds. This may provide higher freedom degree for setting the exposure time, thus making the high speed transfer feasible.

Sixth Embodiment

This embodiment is different from the first embodiment in the reference beam angle control method as shown in FIG. 7.

According to the first embodiment, the actuator 222 is employed for changing the small angle δ. In the embodiment, such change is realized by changing the wavefront by applying aberration to the reference beam.

Figure 17:
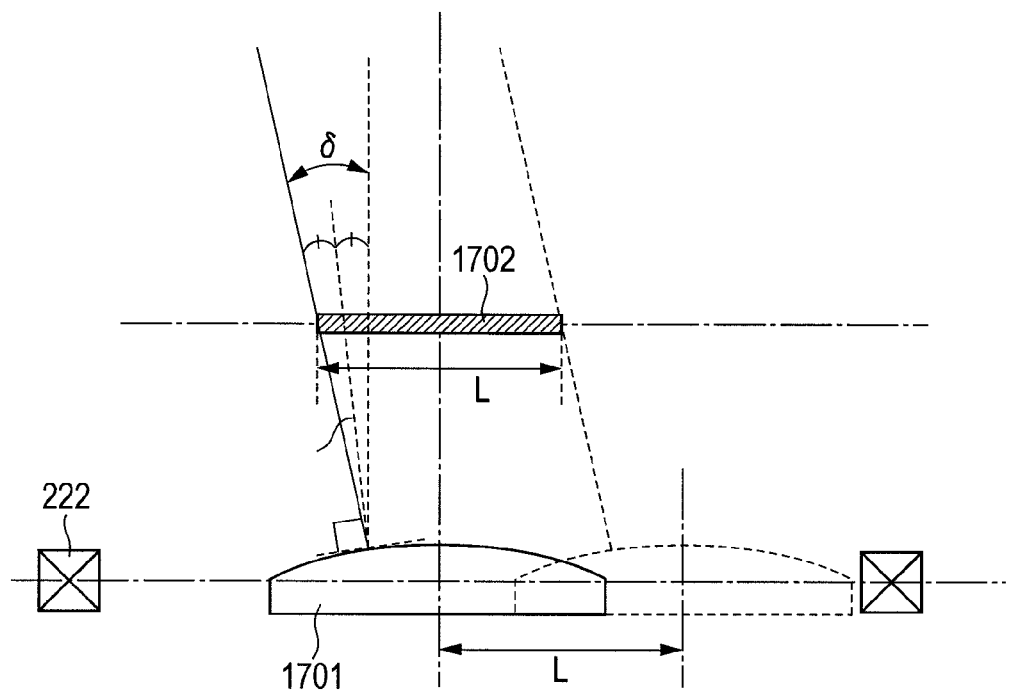
FIG. 17 shows a phase conjugate optical system in the optical information reproduction apparatus according to an exemplary embodiment.

FIG. 17 shows a method for changing a small angle for the reference beam angle.

FIG. 17 shows the use of a deformable mirror 1701 instead of the galvanic mirror 221 as shown in FIG. 7. The actuator 222 configured to change not only the angle of the deformable mirror 1701 but also its position is employed. The deformable mirror holds a thin mirror using a plurality of actuators. The actuators are controlled to deform the mirror shape into an arbitrary shape, thus freely setting the wavefront of the reflecting beam.

The reference beam angle control method using the structure shown in FIG. 17 will be described.

The shape of the deformable mirror 1701 is flat for normally recording at the single reference beam angle. When reproducing the page data recorded at the reference beam angle of $\theta_n$, for example, the actuator 222 is activated. After the reference beam angle reaches the target reference beam angle $\theta_n$, it is oscillated back and forth by the amount (+/−L) corresponding to the magnitude of L of the hologram 1702 recorded in the optical information recording medium 1. The shape of the deformable mirror 1701 is set so as to provide divergent beam or converging beam for setting the differential angle between the center and the edge of the hologram 1702 to δ. The aforementioned operation makes it possible to radiate the optical beam over an entire region of the hologram 1702 at the angle with the margin ranging between +/−δ. The embodiment, thus provides the same effects as those obtained in the first embodiment.

FIG. 17 shows an example of the use of the deformable mirror 1701 as the element for changing the reference beam wavefront. However, it is not limited to the aforementioned structure. The liquid crystal holographic optical device may be employed so long as the reference beam wavefront is changed.

Seventh Embodiment

Figure 9:
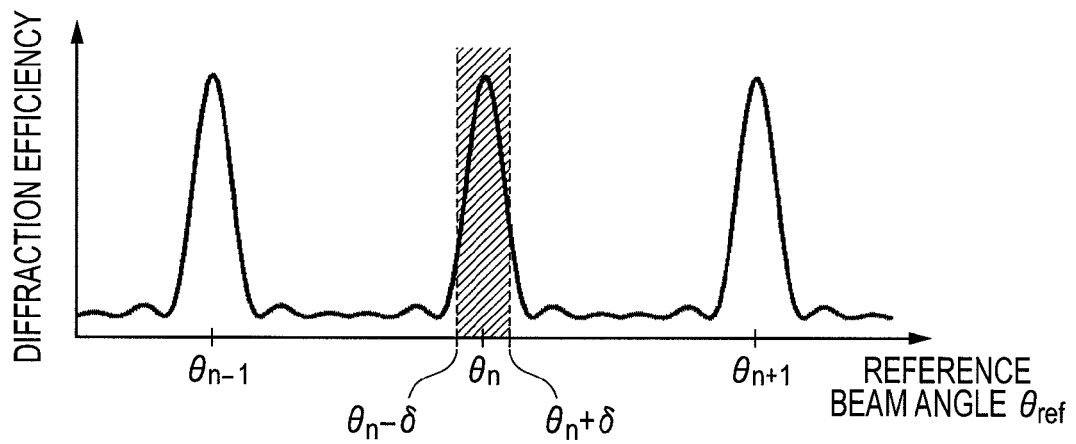
FIG. 9 is a view representing a diffraction efficiency with respect to the reproduction reference beam angle in the optical information reproduction apparatus.

This embodiment is different from the first embodiment in the reference beam angle control method shown in FIG. 7, and the reference beam angle range for exposure shown in FIG. 9.

Figure 18:
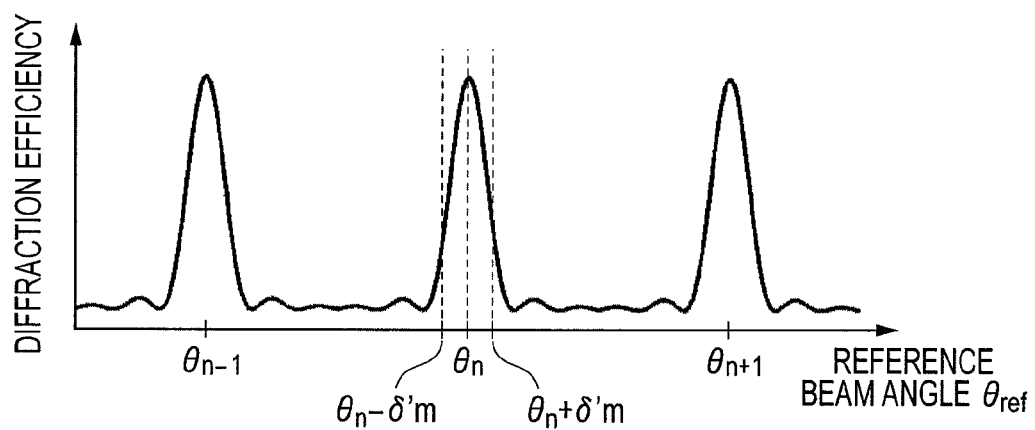
FIG. 18 is a view representing a diffraction efficiency with respect to the reproduction reference beam angle in the optical information reproduction apparatus.

FIG. 18 shows the reference beam angle for exposure according to the exemplary embodiment.

According to the first to the sixth embodiments, the reference beam angle is continuously changed by the small angle δ to enlarge the margin for the reference beam angle. Referring to FIG. 18, in the exemplary embodiment, the exposure at the discrete angle may be performed, for example, $\theta_n - \delta'_m$, $\theta_n$, $\theta_n + \delta'_m$ (m: natural number).

Figure 19:
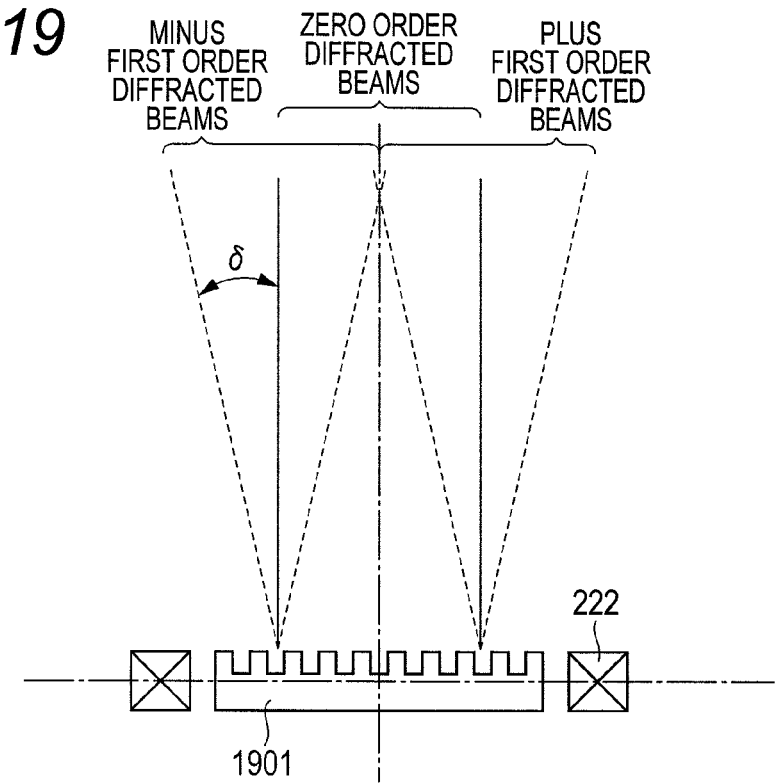
FIG. 19 shows a phase conjugate optical system in the optical information reproduction apparatus according to the exemplary embodiment.

FIG. 19 represents the method for changing the small angle for the reference beam angle in the embodiment.

FIG. 19 shows the use of a reflection type diffracting grating 1901 instead of the galvanic mirror 221. When reproducing the page data recorded at the reference beam angle $\theta_n$, the actuator 222 is activated so as to control that the angle of the zero-order diffracted beams of the reflection type diffraction grating 1901 is set to the reference beam angle $\theta_n$. The grating pitch has to be designed so that, for example, in case of m=1, the primary diffraction angle of the reflection type diffraction grating 1901 becomes δ'.

FIG. 19 shows the use of the reflection type diffraction grating 1901 as the element for generating the diffraction beam. However, it is not limited to the one as described above so long as the diffraction beam is generated. The liquid crystal holographic optical element may be employed, for example.

According to the embodiment, the control for changing the small angle δ is not required. The margin for the reference beam angle may be enlarged using the generally employed reference beam angle control technology, thus making high speed transfer feasible.

Eighth Embodiment

This embodiment is different from the seventh embodiment in the method for changing the small angle for the reference beam angle as shown in FIG. 19.

According to the seventh embodiment, the diffraction grating is used for simultaneously providing different reference beam angles. In this embodiment, a multilayer structure is used.

Figure 20:
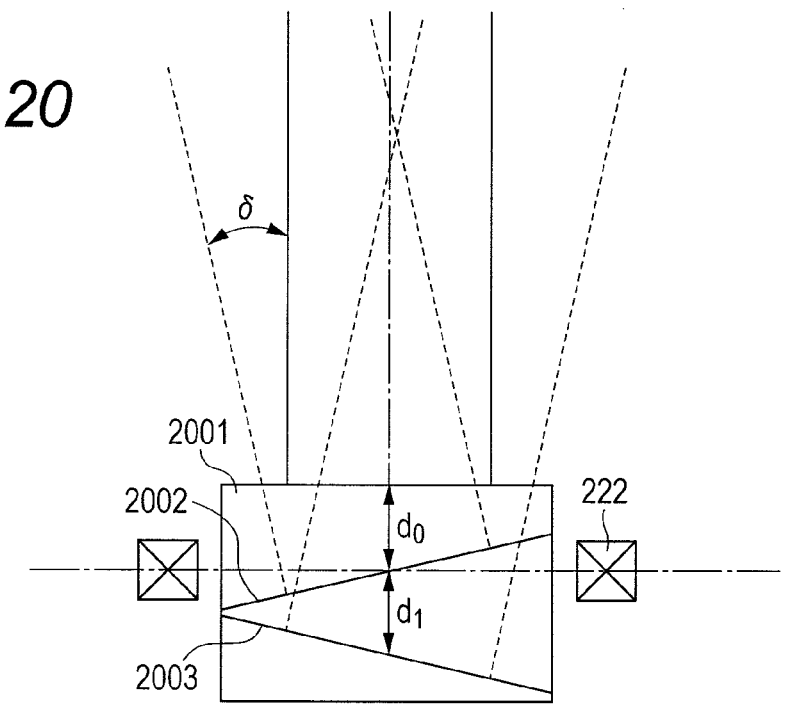
FIG. 20 shows a phase conjugate optical system in the optical information reproduction apparatus according to an exemplary embodiment.

FIG. 20 shows the method for changing the small angle for the reference beam angle according to this embodiment.

Referring to FIG. 20, the multilayer structure is provided instead of the galvanic mirror 221 shown in FIG. 7. The multilayer structure is formed of a first reflection layer 2001, a second reflection layer 2002 and a third reflection layer 2003. When reproducing the page data recorded at the reference beam angle $\theta_n$, the multilayer structure may be controlled by activating the actuator 222 so that the beam reflecting from the first reflection layer 2001 of the multilayer structure is set at the reference beam angle of $\theta_n$. Each reflecting plane between the first reflection layer 2001 and the second reflection layer 2002, and the first reflection layer 2001 and the third reflection layer 2003 is designed to be controlled at the angle of −δ, and +δ, respectively. It is preferable to set a distance d0 between centers of the first reflection layer 2001 and the second reflection layer 2002, and a distance d1 between centers of the second reflection layer 2002 and the third reflection layer 2003 to the value approximately (n+½) of the wavelength (n: natural number) for aligning phases of beams reflecting from the respective reflection layers. However, those distances d0 and d1 are not limited to the aforementioned values.

Referring to FIG. 20, three reflection layers are provided. However, they are not limited to the aforementioned number.

According to the embodiment, the control for changing the small angle δ is not required. Generally employed reference beam angle control technology may be used for enlarging the margin of the reference beam angle, thus making high speed transfer feasible.

Ninth Embodiment

This embodiment is different from the first embodiment in the exposure timing of the photodetector 218 shown in FIG. 8.

According to the first embodiment, while changing the small angle δ, the photodetector 218 is kept exposed. In this embodiment, it is exposed in multiple stages. In the aforementioned embodiment, the small angle δ is changed for reproducing the page data recorded at the reference beam angle $θ_n$. In the embodiment, the position and magnification of the reproduced image are minutely changed to be exact. It is exposed in multiple stages to correct distortion of the reproduced image, and then synthesis is performed to further improve the SNR.

Figure 21:
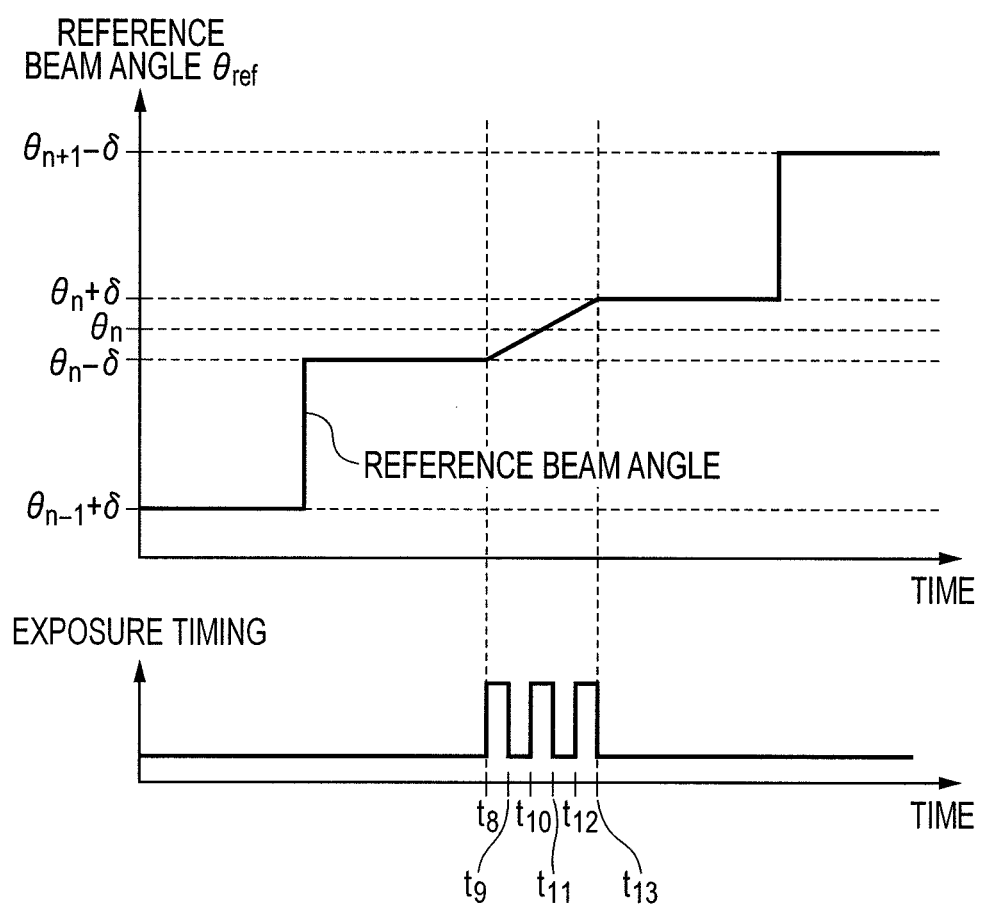
FIG. 21 is a view representing an exposure timing with respect to change in the reproduction reference beam angle in the optical information reproduction apparatus according to an exemplary embodiment.
Figure 22:
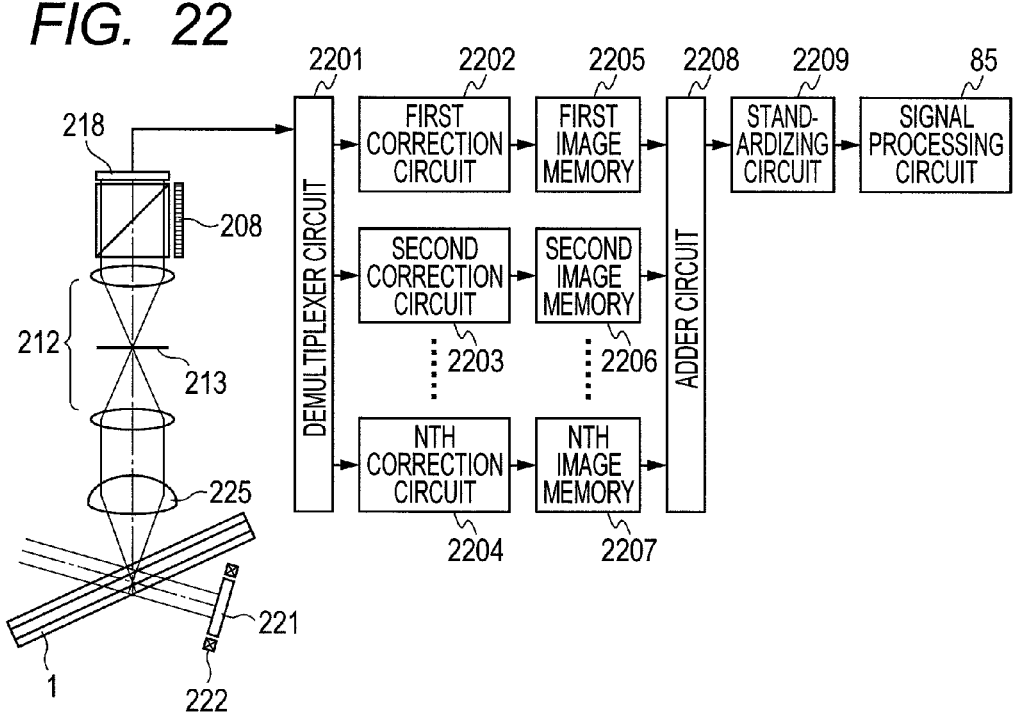
FIG. 22 is a view showing an adder circuit for a plurality of reproduced images in an optical information reproduction apparatus according to the exemplary embodiment.

FIG. 21 shows the exposure timing of the photodetector 218 according to this embodiment. FIG. 22 shows the process for adding a plurality of images according to the embodiment.

Referring to FIG. 21, assuming that the galvanic mirror 221 changes at the angle deviating from the target reference beam angle $θ_n$ by the small angle δ, that is, from $θ_n-δ$ to $θ_n+δ$, the recovered beam which has been made incidence to the photodetector 218 is exposed for a first period (t8 to t9), a second period (t10 to t11) and a third period (t12 to t13). In the embodiment, the exposure is performed in three stages. However, it is not limited to the aforementioned structure.

The method for synthesizing the reproduced images will be described referring to FIG. 22.

The images picked up in three periods are output from the photodetector 218, and allocated to the circuits corresponding to the respective periods by a demultiplexer circuit 2201. The image picked up for the first period has the distortion corrected by a first correction circuit 2202, and stored in a first image memory 2205. Likewise, the image picked up for the second period is subjected to the process by a second correction circuit 2203 and a second image memory 2206. The image picked up for the Nth period is subjected to the process by an Nth correction circuit 2204, and an Nth image memory 2207 (N: natural number). When the image pickup operation is finished at the reference beam angle ranging from $θ_n-δ$ to $θ_n+δ$, images stored in the respective image memories are added by an adder circuit 2208, and the brightness is standardized by a standardizing circuit 2209. The signal processing for decoding into the original user data is executed by the signal processing circuit 85.

Correction of the image does not have to be performed. If the image is not corrected, exposure may be maintained from the first to the Nth period without synthesizing images through the signal processing.

The first embodiment has been described as applicable embodiment. However, any one of those first to the sixth embodiments is applicable.

FIG. 22 shows the circuit to perform the operation. However, software may be used for realizing the same function.

According to the embodiment, distortion of the reproduced image resulting from deviation of the angle from the target reference beam angle may be suppressed, thus further improving the SNR.

Tenth Embodiment

This embodiment is different from the ninth embodiment in the method for adding a plurality of images as shown in FIG. 22.

According to the ninth embodiment, the correction circuits and the image memories are required by the number corresponding to the exposure stages. However, in the embodiment, only one correction circuit and one image memory are necessary for performing the aforementioned process.

Figure 23:
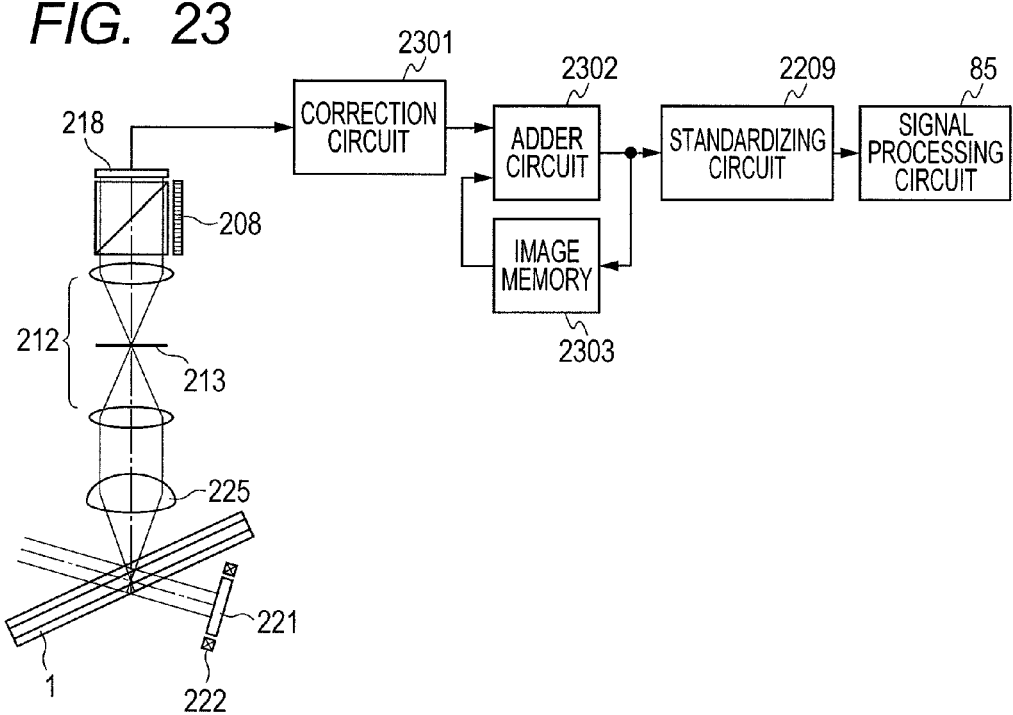
FIG. 23 is a view showing an adder circuit for a plurality of reproduced image in an optical information reproduction apparatus according to an exemplary embodiment.
Figure 24:
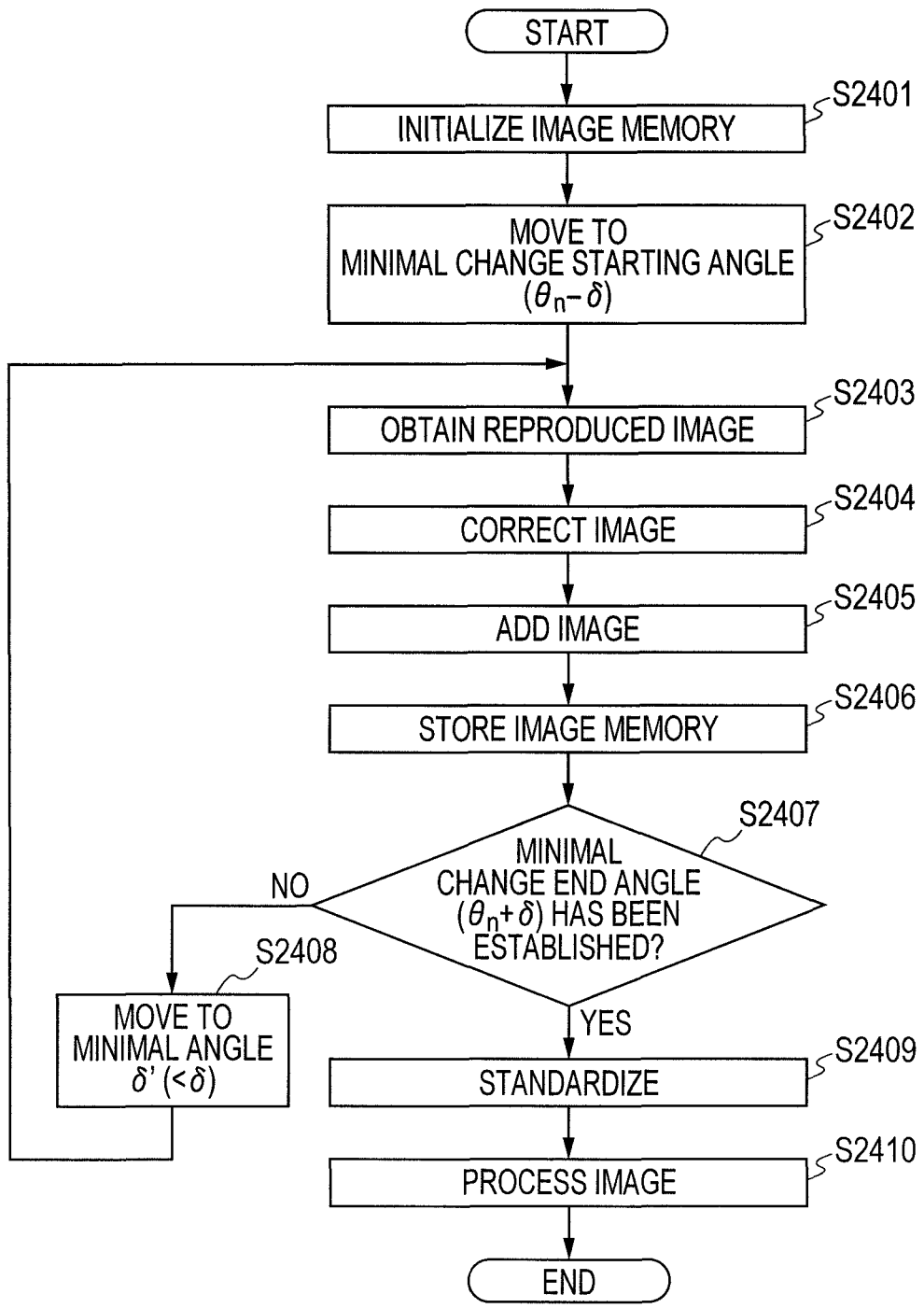
FIG. 24 is a flowchart of the process for reproducing page data in the optical information reproduction apparatus according to the exemplary embodiment.

FIG. 23 shows the method for adding the plurality of images according to this embodiment. FIG. 24 is a flowchart of the process for reproduction according to the embodiment.

The reproduction operation according to the embodiment will be described.

When reproducing the page data recorded at the reference beam angle $θ_n$, an image memory 2303 is initialized in S2401. Then the actuator 222 is activated to change the reference beam angle to $θ_n-δ$ in S2042. The photodetector 218 is exposed to obtain the reproduced image in S2403. The distortion is corrected by a correction circuit 2301 in S2404. The corrected image and the output from the image memory 2303 are added by an adder circuit 2302 in S2405. The result is stored in the image memory 2303 in S2406. At this time, it is determined whether the current reference beam angle reaches $θ_n+δ$ as the angle at which the change in the small angle stops in S2407. If it is determined that the angle has not reached the $θ_n+δ$, the angle is further changed by the small angle δ' (smaller than δ), and the process from S2403 to S2407 is repeatedly executed. If it is determined that the angle has reached $θ_n+δ$, output from the adder circuit 2302 is input to the standardizing circuit 2209 for standardizing brightness in S2409. It is then coded to the original user data by the signal processing circuit 85 in S2410. FIG. 23 shows the circuit used for performing the operation. However, software may be used for realizing the same function.

According to this embodiment, the distortion of the reproduced image resulting from deviation of the angle from the target reference beam angle may be suppressed, thus further improving the SNR. It is possible to reduce the size of circuits to be mounted.

What is claimed is:

1. An optical information reproduction method, for reproducing information from a medium upon which has been recorded an interference pattern in the form of a hologram generated by overlapping a signal beam and a reference beam, the optical information reproduction method comprising:
   during an operation of reproducing one page data from the hologram on which a plurality of page data is recorded:
   branching the reference beam so as to form a plurality of reference beams;
   radiating the plurality of branched reference beams simultaneously to the medium at a plurality of reference angles;
   generating a reproduction beam by diffracting the radiated beams with the hologram;
   detecting the reproduction beam by using a photodetector; and
   reproducing the information by processing a signal output by the photodetector.

2. The optical information reproduction method according to claim 1, wherein branching the reference beam, by diffracting the reference beam, is performed by using an optical element.

3. The optical information reproduction method according to claim 1, wherein branching the reference beam, by reflecting the reference beam at a plurality of angles, is performed by using an optical element.

4. An optical information reproduction apparatus, configured to reproduce information from a medium upon which has been recorded an interference pattern in the form of a hologram generated by overlapping a signal beam and a reference beam, the optical information reproduction apparatus comprising:
   a laser light source configured to generate the reference beam;
   an angle control unit configured to branch the reference beam to form a plurality of branched reference beams, and to radiate the branched reference beams simultaneously to the medium at a plurality of reference angles, during an operation of reproducing one page data from the hologram on which a plurality of page data is recorded;

a photodetector configured to detect a reproduction beam obtained by diffracting the radiated beams with the hologram; and a signal processing unit configured to reproduce the information by processing a signal output by the photodetector.

5. The optical information reproduction apparatus according to claim 4, wherein the angle control unit includes an optical element configured to diffract the reference beam into a plurality of diffraction beams.

6. The optical information reproduction apparatus according to claim 4, wherein the angle control unit includes an optical element configured to reflect the reference beam at a plurality of angles.

7. The optical information reproduction method according to claim 1, wherein when reproducing the information, the reference beam including the plurality of reference angles is radiated to the medium, by changing a wavefront of the reference beam to obtain a wavefront different from that upon recording.

8. The optical information reproduction method according to claim 7, wherein the information is reproduced by oscillating the position of the medium wherein the reference beam is radiated.

9. The optical information reproduction apparatus according to claim 4, wherein when reproducing the information, the reference beam including the plurality of reference angles is radiated to the medium, by changing a wavefront of the reference beam using the angle control unit to obtain a wavefront different from that upon recording.

10. The optical information reproduction apparatus according to claim 9, wherein the information is reproduced by oscillating the position of the medium where the reference basis is radiated.

* * * * *